United States Patent
Propheter-Hinckley (10) Patent No.: US 10,502,070 B2
(45) Date of Patent: Dec. 10, 2019

(54) AIRFOIL WITH LATERALLY INSERTABLE BAFFLE

(71) Applicant: United Technologies Corporation, Farmington, CT (US)

(72) Inventor: Tracy A. Propheter-Hinckley, Manchester, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 357 days.

(21) Appl. No.: 15/354,172

(22) Filed: Nov. 17, 2016

(65) Prior Publication Data

US 2018/0135431 A1 May 17, 2018

(51) Int. Cl.
 *F01D 5/18* (2006.01)
 *F01D 5/14* (2006.01)
 *F01D 17/16* (2006.01)

(52) U.S. Cl.
 CPC ............. *F01D 5/188* (2013.01); *F01D 5/147* (2013.01); *F01D 5/189* (2013.01); *F01D 17/162* (2013.01); *F05D 2220/32* (2013.01); *F05D 2230/60* (2013.01); *F05D 2240/12* (2013.01); *F05D 2240/126* (2013.01); *F05D 2240/30* (2013.01); *F05D 2240/35* (2013.01); *F05D 2260/20* (2013.01); *F05D 2260/201* (2013.01); *F05D 2260/22141* (2013.01); *Y02T 50/676* (2013.01)

(58) Field of Classification Search
 CPC .......... F01D 5/188; F01D 5/189; F01D 5/147; F05D 2240/126; F05D 2260/201; F05D 2260/22141; F05D 2220/32; Y02T 50/676
 See application file for complete search history.

(56) References Cited

U.S. PATENT DOCUMENTS

| 3,215,511 | A |   | 11/1965 | Chisholm |
|---|---|---|---|---|
| 4,137,008 | A |   | 1/1979 | Grant et al. |
| 4,247,259 | A |   | 1/1981 | Saboe et al. |
| 4,396,349 | A |   | 8/1983 | Hueber |
| 4,914,794 | A |   | 4/1990 | Strangman |
| 5,120,192 | A | * | 6/1992 | Ohtomo ................ F01D 5/189 415/115 |

(Continued)

FOREIGN PATENT DOCUMENTS

| EP | 0764764 | 3/1997 |
|---|---|---|
| EP | 1380725 | 1/2004 |

(Continued)

OTHER PUBLICATIONS

U.S. Appl. No. 13/429,474 filed Mar. 26, 2012.

(Continued)

*Primary Examiner* — Peter J Bertheaud
(74) *Attorney, Agent, or Firm* — Carlson, Gaskey & Olds, P.C.

(57) ABSTRACT

An airfoil includes an airfoil section that defines an aerodynamic profile that has leading and trailing ends. The airfoil section spans in a longitudinal direction between first and second end sections. The airfoil section includes an internal cavity that extends between the first and second end sections and a lateral side. The internal cavity includes a baffle seat therein. A baffle is laterally insertable into the internal cavity through the lateral side into a seated position in the baffle seat.

23 Claims, 8 Drawing Sheets

(56) References Cited

U.S. PATENT DOCUMENTS

| | | |
|---|---|---|
| 5,358,379 A | 10/1994 | Pepperman et al. |
| 5,538,380 A | 7/1996 | Norton et al. |
| 5,681,616 A | 10/1997 | Gupta et al. |
| 5,705,231 A | 1/1998 | Nissley et al. |
| 5,951,892 A | 9/1999 | Wolfla et al. |
| 6,000,906 A | 12/1999 | Draskovich |
| 6,102,656 A | 8/2000 | Nissley et al. |
| 6,224,963 B1 | 5/2001 | Strangman |
| 6,316,078 B1 | 11/2001 | Smialek |
| 6,503,574 B1 | 1/2003 | Skelly et al. |
| 6,514,046 B1 | 2/2003 | Morrison et al. |
| 6,543,996 B2 | 4/2003 | Koschier |
| 6,703,137 B2 | 3/2004 | Subramanian |
| 6,709,230 B2 | 3/2004 | Morrison et al. |
| 6,846,574 B2 | 1/2005 | Subramanian |
| 7,104,756 B2 | 9/2006 | Harding et al. |
| 7,316,539 B2 | 1/2008 | Campbell |
| 7,326,030 B2 | 2/2008 | Albrecht et al. |
| 7,435,058 B2 | 10/2008 | Campbell et al. |
| 7,452,182 B2 | 11/2008 | Vance et al. |
| 7,520,725 B1 | 4/2009 | Liang |
| 7,670,116 B1 | 3/2010 | Wilson, Jr. et al. |
| 7,963,745 B1 | 6/2011 | Liang |
| 8,079,806 B2 | 12/2011 | Tholen et al. |
| 8,182,208 B2 | 5/2012 | Bridges, Jr. et al. |
| 8,197,211 B1 | 6/2012 | Liang |
| 8,202,043 B2 | 6/2012 | McCaffrey |
| 8,251,651 B2 | 8/2012 | Propheter-Hinckley et al. |
| 8,366,392 B1 | 2/2013 | Laing |
| 8,480,366 B2 | 7/2013 | Malecki et al. |
| 8,506,243 B2 | 8/2013 | Strock et al. |
| 8,821,124 B2 | 9/2014 | Viens et al. |
| 2008/0159850 A1 | 7/2008 | Tholen et al. |
| 2010/0136258 A1 | 6/2010 | Strock et al. |
| 2016/0090851 A1 | 3/2016 | Carr et al. |
| 2016/0201487 A1* | 7/2016 | Spangler ................ F01D 9/041 415/115 |

FOREIGN PATENT DOCUMENTS

| | | |
|---|---|---|
| EP | 1764481 | 3/2007 |
| EP | 2105579 | 9/2009 |
| EP | 2492442 | 8/2012 |
| EP | 2853688 | 4/2015 |
| EP | 2921649 | 9/2015 |
| EP | 3032034 | 6/2016 |
| GB | 2017229 | 10/1979 |
| GB | 2272453 | 5/1994 |
| JP | 61066802 | 4/1986 |
| JP | 05321602 | 12/1993 |

OTHER PUBLICATIONS

U.S. Appl. No. 14/659,718 filed Mar. 17, 2015.
U.S. Appl. No. 14/812,668 filed Jul. 29, 2015.
Extended European Search Report for European Patent Application No. 17202424.2 dated Jun. 14, 2018.

* cited by examiner

AIRFOIL WITH LATERALLY INSERTABLE BAFFLE

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

The high pressure turbine drives the high pressure compressor through an outer shaft to form a high spool, and the low pressure turbine drives the low pressure compressor through an inner shaft to form a low spool. The fan section may also be driven by the low inner shaft. A direct drive gas turbine engine includes a fan section driven by the low spool such that the low pressure compressor, low pressure turbine and fan section rotate at a common speed in a common direction.

A speed reduction device, such as an epicyclical gear assembly, may be utilized to drive the fan section such that the fan section may rotate at a speed different than the turbine section. In such engine architectures, a shaft driven by one of the turbine sections provides an input to the epicyclical gear assembly that drives the fan section at a reduced speed.

SUMMARY

An airfoil according to an example of the present disclosure includes an airfoil section that defines an aerodynamic profile that has leading and trailing ends. The airfoil section spans in a longitudinal direction between first and second end sections. The airfoil section includes an internal cavity that extends between the first and second end sections and a lateral side. The internal cavity includes a baffle seat therein. A baffle is laterally insertable into the internal cavity through the lateral side into a seated position in the baffle seat.

In a further embodiment of any of the foregoing embodiments, the first end section includes a first spindle and the second end section includes a second spindle, and the airfoil section is rotatable about the first spindle and the second spindle.

In a further embodiment of any of the foregoing embodiments, the second spindle includes an internal cooling passage that opens into the internal cavity of the airfoil section.

In a further embodiment of any of the foregoing embodiments, the first spindle also includes an internal cooling passage, and the internal cooling passage of the first spindle opens into a different internal cavity.

In a further embodiment of any of the foregoing embodiments, the lateral side includes a rib guide and a rib piece that is insertable into the rib guide. The rib piece retains the baffle in the baffle seat.

In a further embodiment of any of the foregoing embodiments, the airfoil section includes a wall. The wall has interior and exterior sides. The interior side bounds the internal cavity and the external side defining a portion of the aerodynamic profile, and the baffle seat spaces the baffle from the wall such that there is a passage between the baffle and the wall.

In a further embodiment of any of the foregoing embodiments, the airfoil section includes forward and aft internal cavities, and the internal cavity with the baffle is between the forward and aft cavities.

In a further embodiment of any of the foregoing embodiments, the first spindle includes an internal cooling passage, and the internal cooling passage of the first spindle is in flow communication with the forward cavity.

In a further embodiment of any of the foregoing embodiments, the baffle tapers in a chord-wise direction of the airfoil section.

In a further embodiment of any of the foregoing embodiments, the baffle includes a baffle wall circumscribing an internal baffle cavity. The baffle wall includes a plurality of cooling holes.

A gas turbine engine according to an example of the present disclosure includes a compressor section, a combustor in fluid communication with the compressor section, and a turbine section in fluid communication with the combustor. One of the turbine section or the compressor section includes an airfoil that has an airfoil section that defines an aerodynamic profile that has leading and trailing ends. The airfoil section spans in a longitudinal direction between first and second end sections. The airfoil section includes an internal cavity extending between the first and second end sections and a lateral side. The internal cavity includes a baffle seat therein. A baffle is laterally insertable into the internal cavity through the lateral side into a seated position in the baffle seat.

In a further embodiment of any of the foregoing embodiments, the first end section includes a first spindle and the second end section includes a second spindle. The airfoil section is rotatable about the first spindle and the second spindle, and the second spindle includes an internal cooling passage that opens into the internal cavity of the airfoil section.

In a further embodiment of any of the foregoing embodiments, the first spindle also includes an internal cooling passage, and the internal cooling passage of the first spindle opens into a different internal cavity.

In a further embodiment of any of the foregoing embodiments, the lateral side includes a rib guide and a rib piece that is insertable into the rib guide. The rib piece retains the baffle in the baffle seat.

In a further embodiment of any of the foregoing embodiments, the airfoil section includes a wall. The wall has interior and exterior sides. The interior side bounds the internal cavity and the external side defining a portion of the aerodynamic profile, and the baffle seat spaces the baffle from the wall such that there is a passage between the baffle and the wall.

In a further embodiment of any of the foregoing embodiments, the airfoil section includes forward and aft internal cavities, and the internal cavity with the baffle is between the forward and aft cavities.

A method according to an example of the present disclosure includes inserting a baffle through a lateral side of an internal cavity of an airfoil section into a seated position in a baffle seat in the internal cavity. The airfoil section defines an aerodynamic profile that has leading and trailing ends. The airfoil section spans in a longitudinal direction between first and second end sections, and the internal cavity extends between the first and second end sections and the lateral side.

In a further embodiment of any of the foregoing embodiments, the lateral side includes a rib guide, and inserting a rib piece into the rib guide. The rib piece retains the baffle in the baffle seat.

In a further embodiment of any of the foregoing embodiments, the first end section includes a first spindle and the second end section includes a second spindle that has an internal cooling passage that opens into the internal cavity of the airfoil section, and rotating the airfoil section about the first spindle and the second spindle.

An airfoil according to an example of the present disclosure includes first and second end sections, and an airfoil section spanning in a longitudinal direction between the first and second end sections. The airfoil section defines an aerodynamic profile that has leading and trailing ends. The airfoil section includes a plurality of internal cavities extending between the first and second end sections. The plurality of cavities include forward and aft cavities, and an auxiliary cavity disposed radially of the aft cavity and a divider wall separating the auxiliary cavity from the aft cavity. One of the first or second end sections includes an inlet passage disposed radially of the auxiliary cavity. The inlet passage opens to the auxiliary cavity, and the auxiliary cavity opens to the forward cavity.

In a further embodiment of any of the foregoing embodiments, the inlet passage is in a spindle about which the airfoil section is rotatable.

In a further embodiment of any of the foregoing embodiments, the forward cavity is a forward-most cavity in the airfoil section.

In a further embodiment of any of the foregoing embodiments, the plurality of cavities includes an aft-most cavity, and the aft cavity is between the aft-most cavity and the forward-most cavity.

In a further embodiment of any of the foregoing embodiments, the auxiliary cavity and the forward-most cavity are sealed from the aft cavity and the aft-most cavity.

In a further embodiment of any of the foregoing embodiments, the aft cavity includes a baffle seat, and further comprising a baffle laterally insertable into the aft cavity through a lateral side of the aft cavity into a seated position in the baffle seat.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
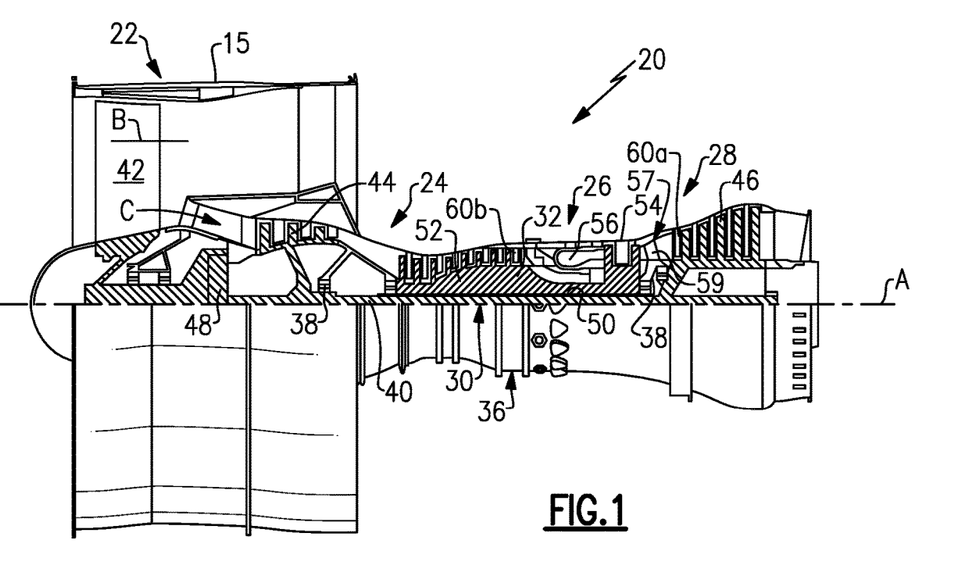
FIG. 1 illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engine designs can include an augmentor section (not shown) among other systems or features.

The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, the examples herein are not limited to use with two-spool turbofans and may be applied to other types of turbomachinery, including direct drive engine architectures, three-spool engine architectures, and ground-based turbines.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 may be connected to the fan 42 through a speed change mechanism, which in exemplary gas turbine engine 20 is illustrated as a geared architecture 48, to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged between the high pressure compressor 52 and the high pressure turbine 54. A mid-turbine frame 57 of the engine static structure 36, if included, is arranged generally between the high pressure turbine 54 and the low pressure turbine 46. The mid-turbine frame 57 further supports the bearing systems 38 in the turbine section 28. The inner shaft 40 and the outer shaft 50 are concentric and rotate via bearing systems 38 about the engine central longitudinal axis A, which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines, including direct drive turbofans and gas turbines with multiple bypass streams.

A significant amount of thrust is provided by the bypass flow B due to the high bypass ratio. The fan section 22 of the engine 20 may be designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second.

In gas turbine engines air is often bled from the compressor for cooling components in the turbine that cannot withstand stoichiometric ideal temperatures of fuel burn; however, compressor bleed penalizes engine efficiency. Efficiency is governed by thermodynamics and mass flow through the turbine. Efficiency can generally be increased by lowering volume of compressor bleed, increasing velocity of compressor bleed, or increasing temperature of compressor bleed. These goals are challenging to meet because compressor bleed relies on the pressure differential between the compressor and the turbine. That is, the goals of lower volume, increased velocity, and increased temperature of compressor bleed are generally opposite to the goals of high pressure and low temperature compressor bleed desired for achieving good pressure differential. In this regard, to facilitate overcoming such challenges, an approach taken in this disclosure is to reduce the need for compressor bleed and cooling by enhancing the temperature resistance capability of the turbine or other components exposed to high temperatures. In particular, thermal resistance can be enhanced at the compressor exit and turbine inlet.

Figure 2:
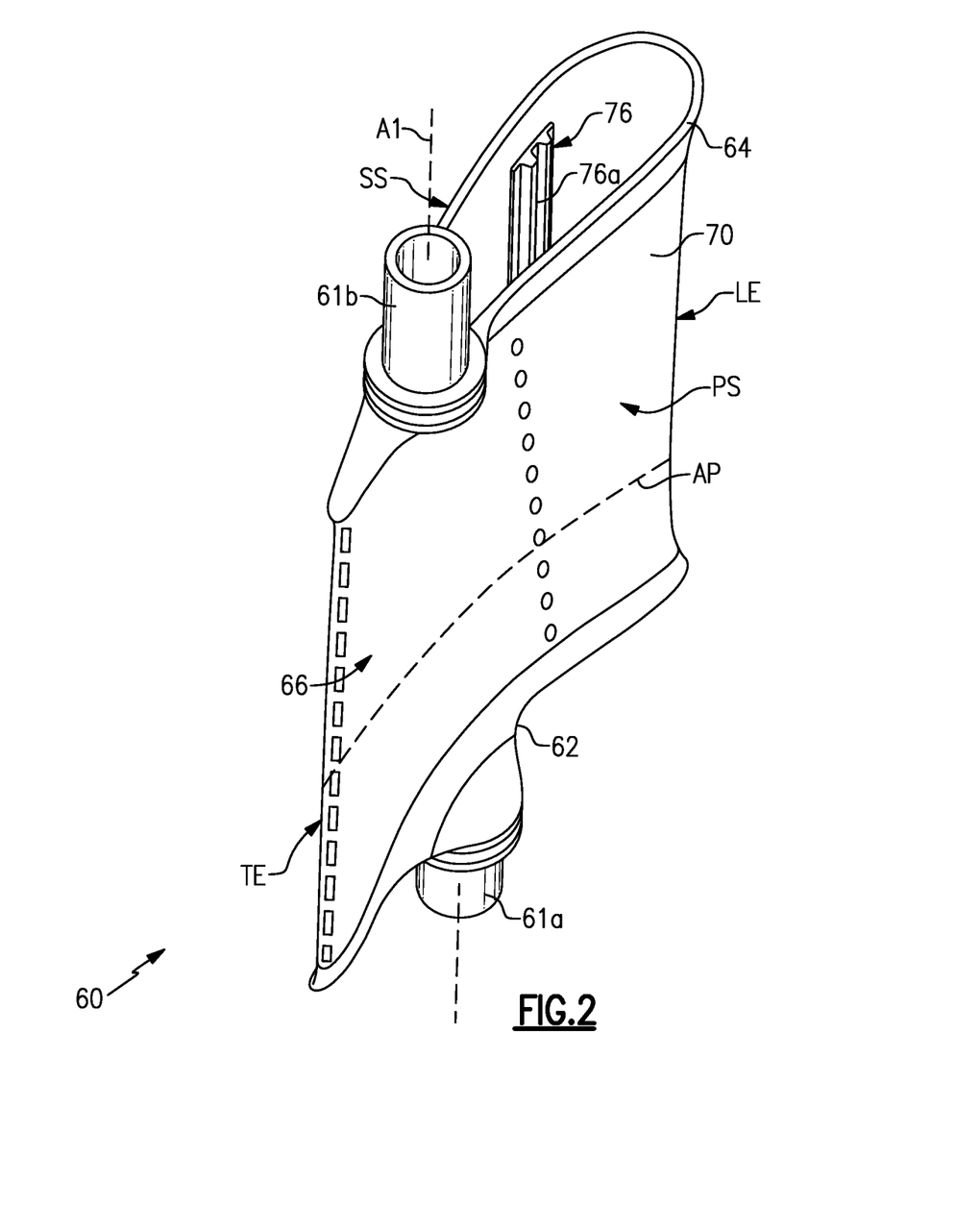
FIG. 2 illustrates selected portions of an example airfoil in the engine.
Figure 3:
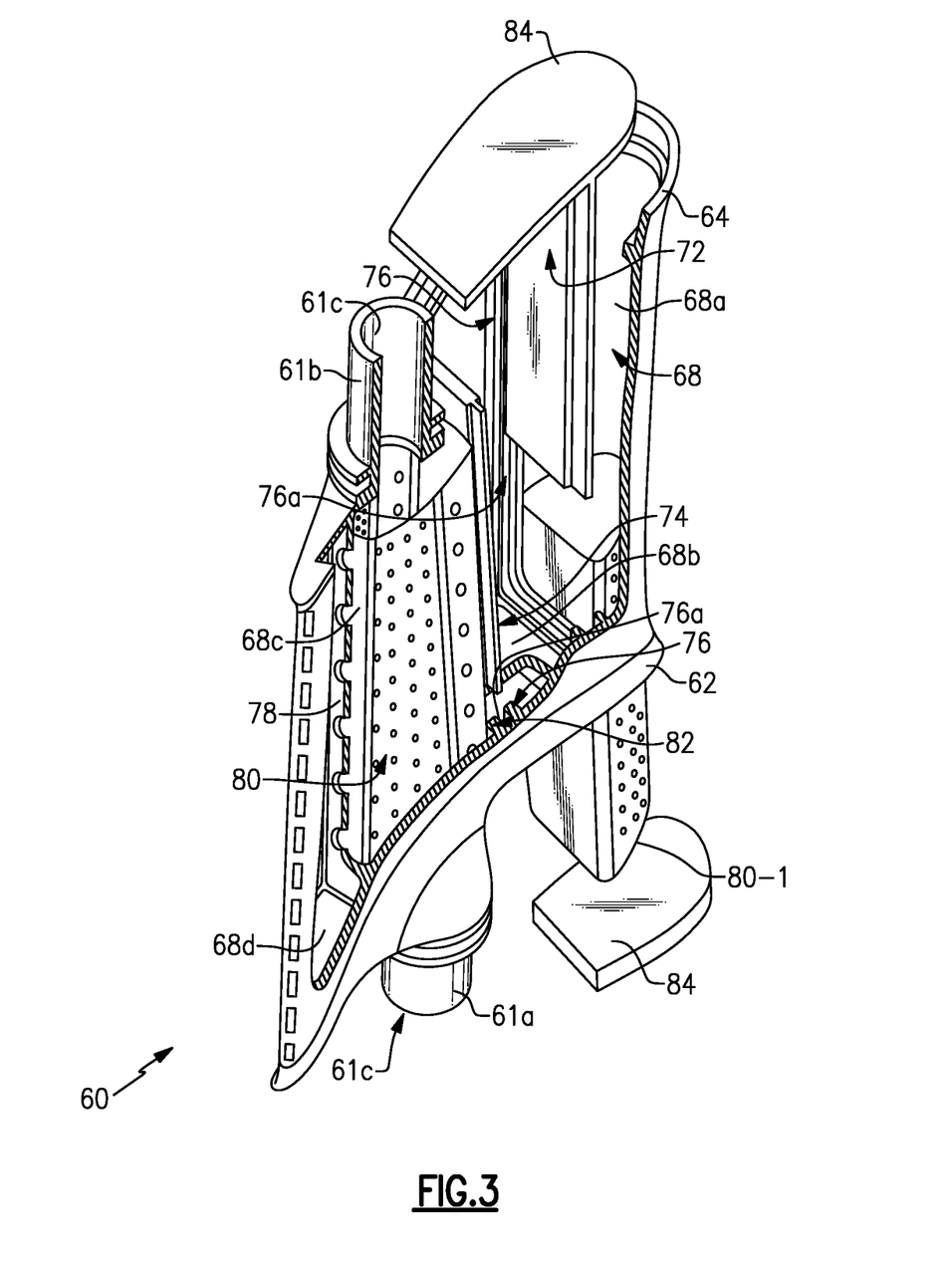
FIG. 3 illustrates an exploded view of the airfoil of FIG. 2.

FIG. 2 illustrates selected portions of an example airfoil 60 used in the engine 20, and FIG. 3 illustrates an exploded view of the airfoil 60. For instance, the airfoil 60 can be a turbine vane, as represented at 60a in FIG. 1, or a compressor vane, as represented at 60b in FIG. 1. As will be appreciated, although the examples herein may be described in the context of a vane, this disclosure is not limited to vanes, and the examples may also be applicable to blades or other airfoils that are exposed to high temperatures.

The airfoil 60 includes a first or inner end section 62, a second or outer end section 64, and an airfoil section 66 that spans in a longitudinal direction between the first and second end sections 62/64. The longitudinal direction is also the radial direction in the engine 20 with regard to the engine central axis A. The airfoil section 66 defines an airfoil profile, AP, which is the peripheral shape of the airfoil section 66 when viewed in a radial direction. For example, the airfoil profile has a wing-like shape that provides a reaction force via Bernoulli's principle with regard to flow over the airfoil section 66. The airfoil profile AP generally includes a leading end (LE), a trailing end (TE), a pressure side (PS), and a suction side (SS). In this example, the airfoil 60 is a variable vane. For example, the leading end (LE) is the region of the airfoil profile (AP) that includes a leading edge of the airfoil profile (AP), and the trailing end (TE) is the region of the airfoil profile that includes a trailing edge. The leading edge may be the portion of the airfoil profile (AP) that first contacts air or the foremost edge of the airfoil profile (AP). The trailing edge may be the portion of the airfoil profile (AP) that last contacts air or the aftmost edge of the airfoil profile (AP). For a variable vane, the leading edge may shift, depending on the orientation of the vane.

The first end 62 of the airfoil 60 includes a first axle or spindle 61a and the second end 64 includes a second axle or spindle 61b. The airfoil 60 is rotatable about the spindles 61a/61b (about axis A1).

The airfoil section 66 is hollow and includes a plurality of internal cavities 68. In this example, the airfoil section 66 includes four internal cavities, which are individually designated 68a/68b/68c/68d. As will be appreciated, modified examples may include fewer cavities or additional cavities. Here, cavities 68a/68b are forward cavities, with cavity 68a being the forward-most cavity. Cavities 68c/68d are aft cavities, with cavity 68d being the aft-most cavity. Cavity 68b may also be considered an aft cavity, aft of the forward-most cavity 68a.

In this example, the cavities 68a/68b/68c/68d extend between the first and second end sections 62/64 and are bound on lateral sides by walls 70 that form the pressure side (PS) and the suction side (SS) of the airfoil section 60. The cavities 68a/68b are also divided and bound on lateral sides by a first insertable rib 72, and the cavities 68b/68c are divided and bound on lateral sides by a second insertable rib 74. The ribs 72/74 are retained in respective rib guides 76. For instance, the rib guides 76 include longitudinal slots 76a into which the respective ribs 72/74 are inserted and retained. A perforated wall 78 laterally divides and bounds the cavities 68c/68d.

Figure 4:
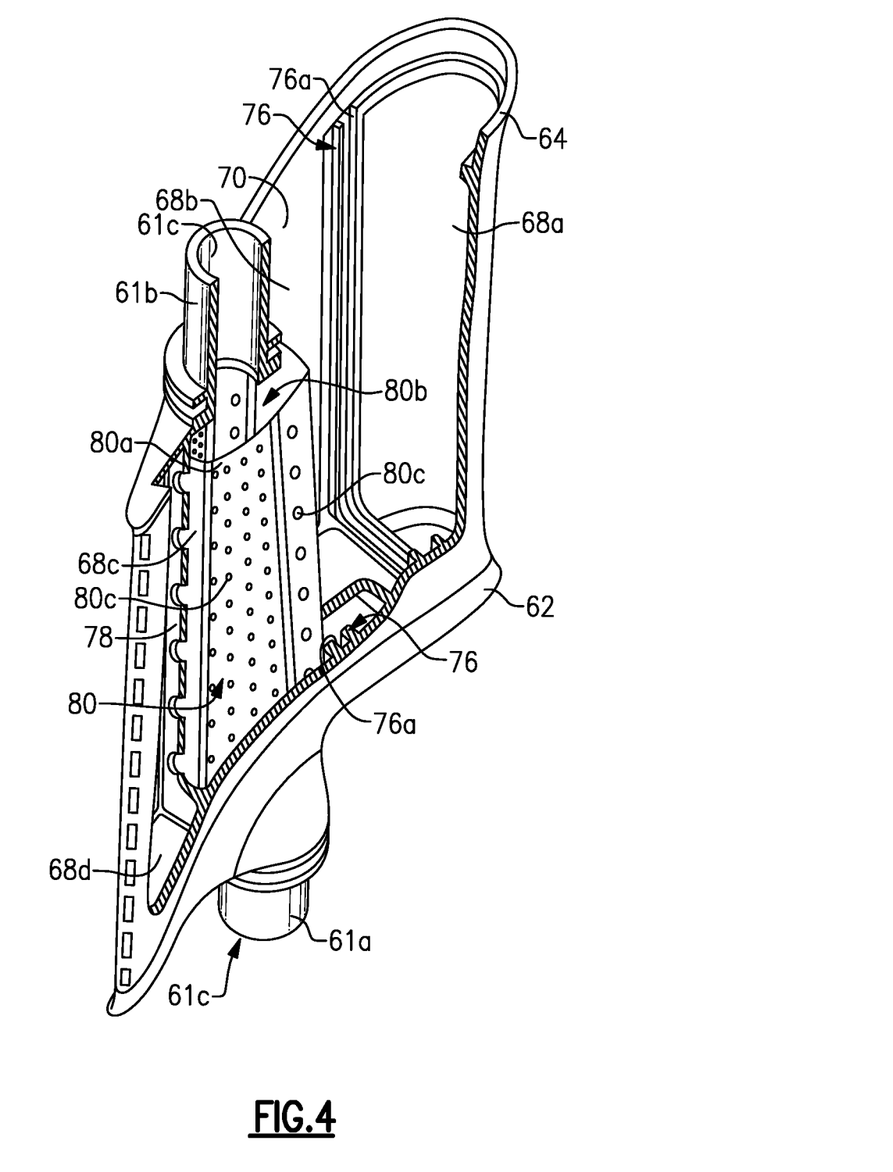
FIG. 4 illustrates a partial cut away view of the airfoil of FIG. 2.
Figure 5:
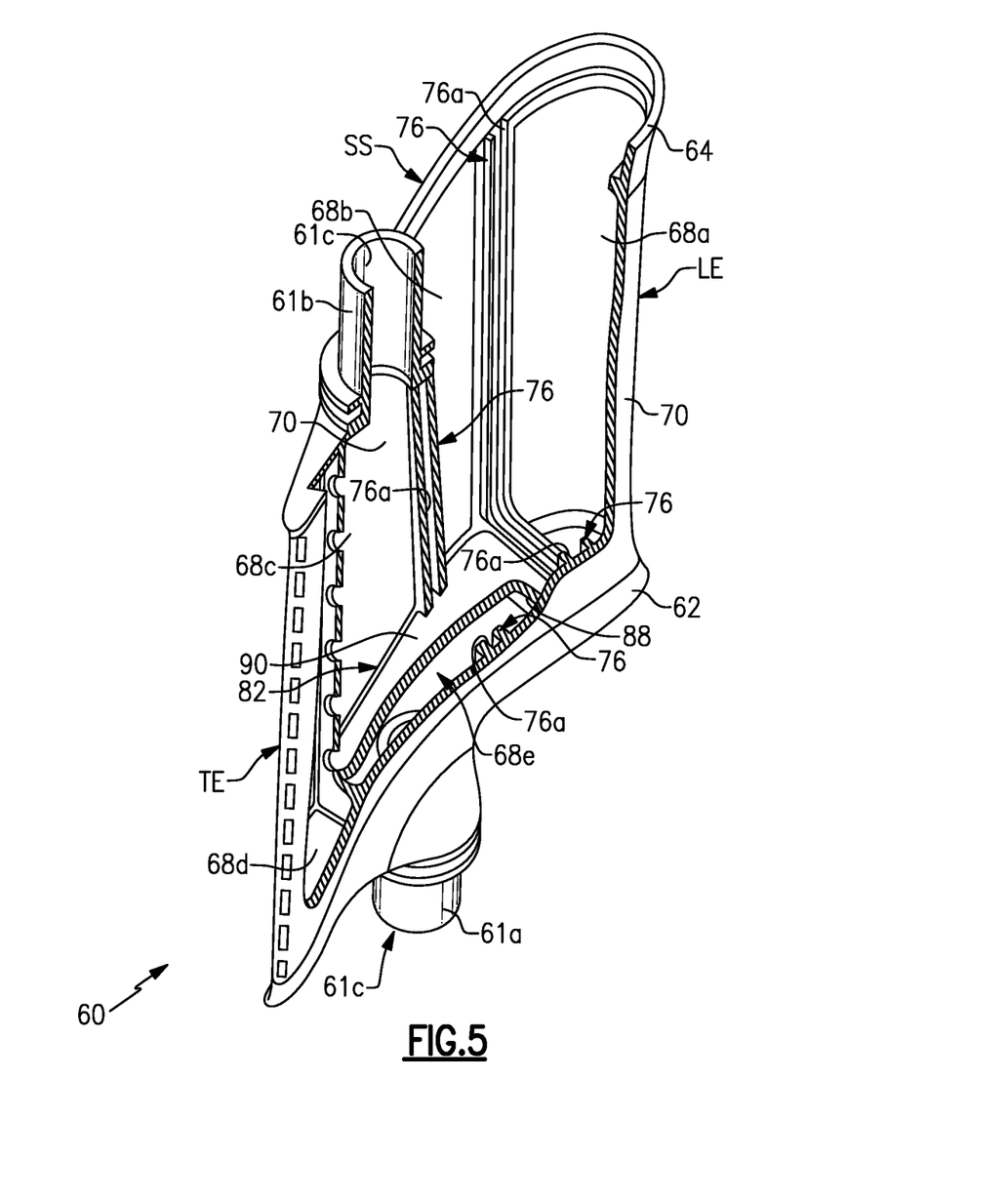
FIG. 5 illustrates a partial cut away view of the airfoil of FIG. 2, without the baffle shown.

To facilitate distribution of cooling bleed air, the airfoil 60 includes one or more baffles 80. The baffle 80 is also shown in a partially cut away view of the airfoil 60 in FIG. 4, while FIG. 5 shows the cut away view of the airfoil 60 without the baffle 80. In this example, the internal cavity 68c includes a baffle seat 82 and the baffle 80 is seated in the baffle seat 82 in the internal cavity 68c. For instance, the baffle seat 82 may include one or more ledges, recesses, protrusions, or the like that contact and support the baffle 80 in the cavity 68c.

The location of spindles radially inwards and outwards of a cavity presents a challenge because the spindles block radial access to the cavity for installation of a baffle. However, the airfoil 60 is configured such that the baffle 80 is laterally insertable through a lateral side of the cavity 68c into the baffle seat 82. For example, prior to insertion of the rib 74 into the rib guide 76, a lateral side of the cavity 68c is open. The baffle 80 has a geometry such that it can be inserted radially into the airfoil section 66 forward of the cavity 68c and then moved in an aft direction through the lateral side into the cavity 68c and seated on the baffle seat 82.

Figure 6A:
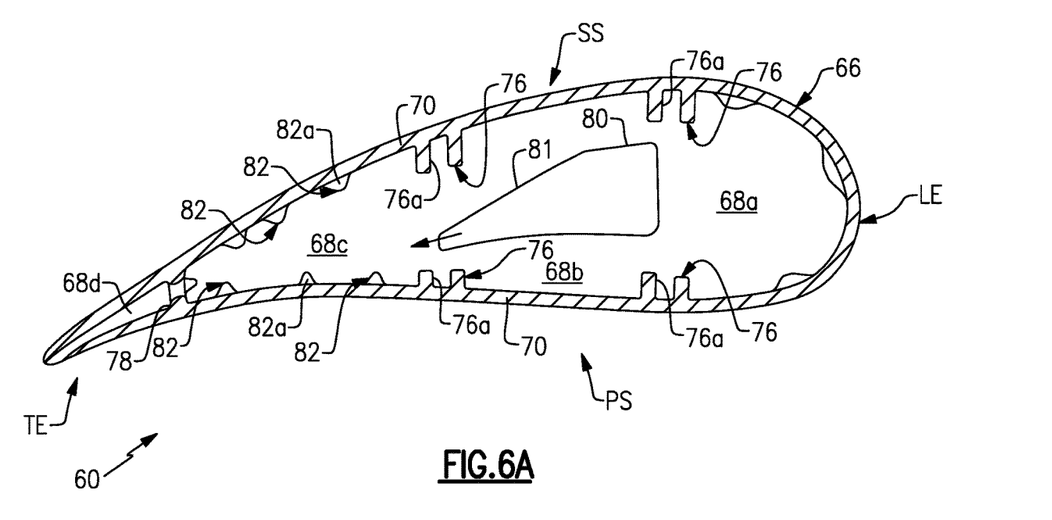
FIGS. 6A, 6B, and 6C illustrates a series of cross-sectional views of a baffle being installed into an airfoil section.
Figure 6B:
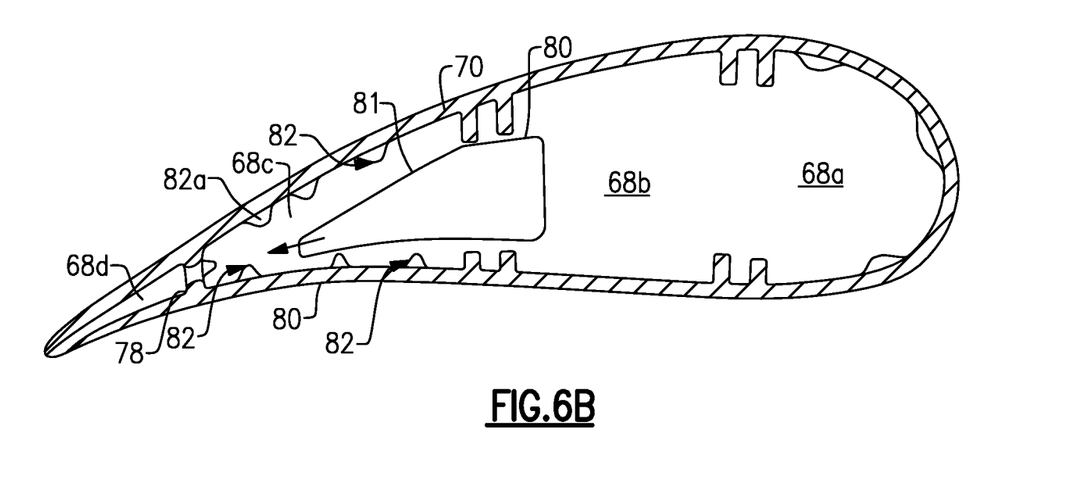
Figure 6C:
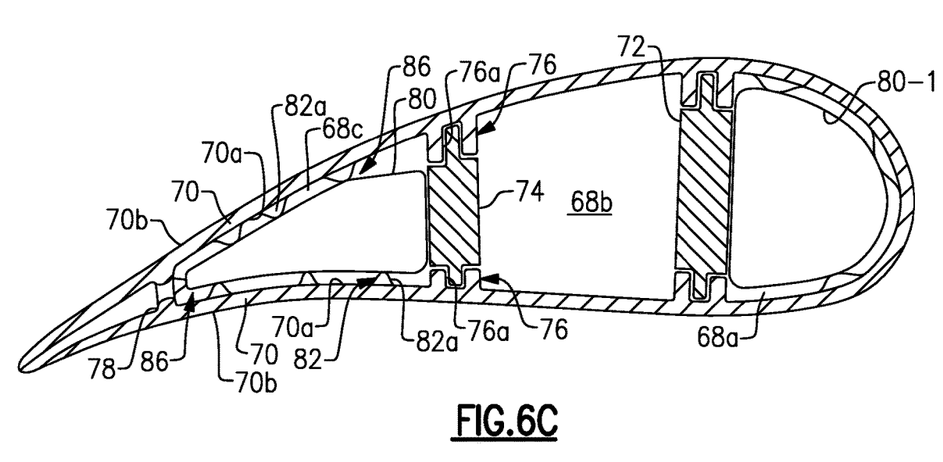

This installation process is also depicted in the series of FIGS. 6A/6B/6C. In FIG. 6A, the baffle 80 is moved in a radial direction into the airfoil section 66. For instance, the first or second end sections 62/64 are initially open and the baffle 80 is inserted into the cavity 68b. A portion of the baffle 80 may also be in other cavities, such as cavity 68a in this example.

As depicted in FIG. 6B, the baffle 80 is then moved in an aft or chord-wise direction into the cavity 68c. In this regard, the lateral side of the cavity 68c where in the rib 74 will be inserted is large enough to fit the baffle 80 through. The baffle 80 is also tapered at 81 to facilitate insertion into the cavity 68c. The baffle 80 is moved until it seats in the baffle seat 82, which in the illustrated example include protrusions 82a that extend from the wall 70. Once seated, the rib 74 is inserted into the rib guide 76. The rib 74 retains the baffle 80 in the cavity 68c. In this regard, the baffle 80 may be free-floating in the cavity 68c, although the baffle 80 could also be bonded in place in the baffle seat 82 if desired. If free-floating, the baffle 80 may provide vibration damping via frictional interaction in the baffle seat 82 during engine 20 operation.

The airfoil section 66 may also include other baffles, such as baffle 80-1 (FIG. 3). In this example, baffle 80-1 is installed radially into the cavity 68a, although the baffle 80-1 could alternatively be configured for lateral insertion similar to baffle 80. After insertion of the baffles 80, 80-1, and any other baffles, the ends sections 62/64 are closed. For example one or more covers 84 are attached to the end sections 62/64. For instance, the cover or covers 84 may be welded or otherwise bonded to the end sections 62/64.

The spindles 61a/61b include internal cooling inlet passages 61c through which cooling bleed air is provided. The inlet passage 61c of the second spindle 61b opens to the cavity 68c. The baffle 80 includes a baffle wall 80a (FIG. 4) that circumscribes an internal baffle cavity 80b. The inlet passage 61c of the spindle 61b feeds cooling bleed air into the internal baffle cavity 80b. The baffle wall 80a includes holes 80c. The holes 80c distribute the cooling bleed air from the baffle cavity 80b to the wall 70, rib 74, and/or perforated wall 78. For instance, the baffle seat 82 spaces the baffle 80 from the wall 70 (see FIG. 6C) such that there is a passage 86 between the baffle 80 and the wall 70. The holes 80c in the baffle wall 80a serve as impingement cooling holes to direct cooling bleed air toward the interior surface 70a of the wall 70. Thus, as hot gases flow in the core gas path over the exterior side or surface 70b of the wall 70, the baffle 80 provide cooling to the interior side or surface 70a to cool the wall 70. The baffle 80 may similarly provide cooling bleed air to the rib 74 and to the perforated wall 78 for communication into the cavity 68d.

Cooling bleed air is also provided into the airfoil section 66 through the inlet passage 61c in the first spindle 61a. In this example, the spindle 61a is radially disposed of the cavities 68b/68c. The inlet passage 61c of the first spindle 61a opens to an auxiliary cavity 68e (FIG. 5). In this example, the auxiliary cavity 68e is in the first end section 62. The auxiliary cavity 68e is radially disposed of the cavities 68b/68c and opens at hole 88 to the cavity 68a. A divider wall 90 separates the auxiliary cavity 68e from the cavities 68b/68c. The divider wall 90 seals the auxiliary cavity 69e from the cavities 68b/68c/68d. The first insertable rib 72 seals the cavity 68a from the cavity 68b. The auxiliary cavity 68e and the cavity 68a are thus sealed from the cavities 68b/68c/68e.

Cooling bleed air in the inlet passage 61c feeds into the auxiliary cavity 68e, and the auxiliary cavity 68e feeds the cooling bleed air to the cavity 68a to cool the leading end (LE). The wall 70 in the region of the leading end (LE) may include holes or slots for providing film cooling over the exterior surface 70b at the leading end (LE). There is thus at least two distinct cooling circuits in the airfoil 60—the first including the inlet passage 61c in the second spindle 61b and the cavities 68c/68d and the second including the inlet passage 61c of the first spindle 61a, the auxiliary cavity 68e, and the cavity 68a. Additionally or alternatively, a portion of the cooling bleed air from the cavity 68a or from the cavity 68c may be provided into the cavity 68b, or the cavity 68b may not receive any cooling bleed air.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. An airfoil comprising:
an airfoil section defining an aerodynamic profile having leading and trailing ends, the airfoil section spanning in a longitudinal direction between first and second end sections, the first end section including a first spindle and the second end section including a second spindle, and the airfoil section being rotatable about the first spindle and the second spindle, the airfoil section including an internal cavity extending between the first and second end sections and a lateral side, the internal cavity including a baffle seat therein; and
a baffle laterally insertable into the internal cavity through the lateral side into a seated position in the baffle seat.

2. The airfoil as recited in claim 1, wherein the second spindle includes an internal cooling passage that opens into the internal cavity of the airfoil section.

3. The airfoil as recited in claim 2, wherein the first spindle also includes an internal cooling passage, and the internal cooling passage of the first spindle opens into a different internal cavity.

4. The airfoil as recited in claim 1, wherein the lateral side includes a rib guide and a rib piece that is insertable into the rib guide, the rib piece retaining the baffle in the baffle seat.

5. The airfoil as recited in claim 1, wherein the airfoil section includes a wall, the wall having interior and exterior sides, the interior side bounding the internal cavity and the external side defining a portion of the aerodynamic profile, and the baffle seat spaces the baffle from the wall such that there is a passage between the baffle and the wall.

6. The airfoil as recited in claim 1, wherein the airfoil section includes forward and aft internal cavities, and the internal cavity is between the forward and aft cavities.

7. The airfoil as recited in claim 6, wherein the first spindle includes an internal cooling passage, and the internal cooling passage of the first spindle is in flow communication with the forward cavity.

8. The airfoil as recited in claim 1, wherein the baffle tapers in a chord-wise direction of the airfoil section.

9. The airfoil as recited in claim 1, wherein the baffle includes a baffle wall circumscribing an internal baffle cavity, the baffle wall including a plurality of cooling holes.

10. A gas turbine engine comprising:
a compressor section;
a combustor in fluid communication with the compressor section; and
a turbine section in fluid communication with the combustor,
at least one of the turbine section or the compressor section including an airfoil having
an airfoil section defining an aerodynamic profile having leading and trailing ends, the airfoil section spanning in a longitudinal direction between first and second end sections, the first end section including a first spindle and the second end section including a second spindle, and the airfoil section being rotatable about the first spindle and the second spindle, the airfoil section including an internal cavity extending between the first and second end sections and a lateral side, the internal cavity including a baffle seat therein, and
a baffle laterally insertable into the internal cavity through the lateral side into a seated position in the baffle seat.

11. The gas turbine section as recited in claim 10, wherein the second spindle includes an internal cooling passage that opens into the internal cavity of the airfoil section.

12. The gas turbine engine as recited in claim 11, wherein the first spindle also includes an internal cooling passage, and the internal cooling passage of the first spindle opens into a different internal cavity.

13. The gas turbine engine as recited in claim 10, wherein the lateral side includes a rib guide and a rib piece that is insertable into the rib guide, the rib piece retaining the baffle in the baffle seat.

14. The gas turbine engine as recited in claim 10, wherein the airfoil section includes a wall, the wall having interior and exterior sides, the interior side bounding the internal cavity and the external side defining a portion of the aerodynamic profile, and the baffle seat spaces the baffle from the wall such that there is a passage between the baffle and the wall.

15. The gas turbine engine as recited in claim 10, wherein the airfoil section includes forward and aft internal cavities, and the internal cavity is between the forward and aft cavities.

16. A method comprising:
inserting a baffle through a lateral side of an internal cavity of an airfoil section into a seated position in a baffle seat in the internal cavity, wherein the airfoil section defines an aerodynamic profile having leading and trailing ends, the airfoil section spans in a longitudinal direction between first and second end sections, the first end section including a first spindle and the second end section including a second spindle, and the airfoil section being rotatable about the first spindle and the second spindle, and the internal cavity extends between the first and second end sections and the lateral side.

17. The method as recited in claim 16, wherein the lateral side includes a rib guide, and inserting a rib piece into the rib guide, the rib piece retaining the baffle in the baffle seat.

18. The method as recited in claim 17, wherein the second spindle has an internal cooling passage that opens into the internal cavity of the airfoil section, and rotating the airfoil section about the first spindle and the second spindle.

19. An airfoil comprising:
first and second end sections;
an airfoil section spanning in a longitudinal direction between the first and second end sections, the airfoil section defining an aerodynamic profile having leading and trailing ends;
the airfoil section including a plurality of internal cavities extending between the first and second end sections, the plurality of cavities including forward and aft cavities;
an auxiliary cavity disposed radially of the aft cavity and a divider wall separating the auxiliary cavity from the aft cavity;
one of the first or second end sections including an inlet passage disposed radially of the auxiliary cavity, the inlet passage opening to the auxiliary cavity, and the auxiliary cavity opening to the forward cavity, wherein the inlet passage is in a spindle about which the airfoil section is rotatable.

20. The airfoil as recited in claim 19, wherein the forward cavity is a forward-most cavity in the airfoil section.

21. The airfoil as recited in claim 20, wherein the plurality of cavities includes an aft-most cavity, and the aft cavity is between the aft-most cavity and the forward-most cavity.

22. The airfoil as recited in claim 21, wherein the auxiliary cavity and the forward-most cavity are sealed from the aft cavity and the aft-most cavity.

23. The airfoil as recited in claim 19, wherein the aft cavity includes a baffle seat, and further comprising a baffle laterally insertable into the aft cavity through a lateral side of the aft cavity into a seated position in the baffle seat.

* * * * *